(12) United States Patent
Kido

(10) Patent No.: US 6,538,670 B1
(45) Date of Patent: Mar. 25, 2003

(54) POINTING METHOD

(75) Inventor: Kazutaka Kido, Tondabayashi (JP)

(73) Assignee: Sanyo Electric Company, Ltd., Osaka (JP)

( * ) Notice: Subject to any disclaimer, the term of this patent is extended or adjusted under 35 U.S.C. 154(b) by 0 days.

(21) Appl. No.: 09/487,808

(22) Filed: Jan. 20, 2000

(30) Foreign Application Priority Data

Jan. 25, 1999 (JP) ............................................ 11-016003

(51) Int. Cl.⁷ ................................................. G09G 5/00
(52) U.S. Cl. ........................ 345/767; 345/763; 345/840
(58) Field of Search ................................ 345/762–764, 345/767, 810, 817, 840, 864, 866, 961, 33, 57, 55; 700/83, 85

(56) References Cited

U.S. PATENT DOCUMENTS 5,539,426 A  *  7/1996  Nishikawa et al. ........... 725/37
5,602,596 A  *  2/1997  Claussen et al. .............. 725/60
6,288,708 B1 *  9/2001  Stringer ....................... 345/169

* cited by examiner

*Primary Examiner*—John Cabeca
*Assistant Examiner*—Tadesse Hailu
(74) *Attorney, Agent, or Firm*—Smith, Gambrell & Russell, LLP

(57) ABSTRACT

A target selection object is selected by providing N (N is an integer of not less than two) keys used for pointing, dividing a screen into N areas in correspondence with the N keys and displaying the N areas such that they can be distinguished, enlarging, when the key corresponding to the area where the target selection object exists is operated by a user, only the area corresponding to the key to the size of one screen and displaying the screen obtained by the enlargement, and dividing the screen into N areas in correspondence with an arrangement of the N keys and displaying the N areas such that they can be distinguished, and performing the same processing every time a key operation is performed by the user.

2 Claims, 3 Drawing Sheets

POINTING METHOD

BACKGROUND OF THE INVENTION

1. Field of the Invention

The present invention relates to a pointing method for selecting a target selection object from a plurality of selection objects such as icons which are displayed on a display device in a small-sized electronic equipment, a portable electronic equipment, or the like.

2. Description of the Prior Art

As a method of selecting one icon from a plurality of icons which are displayed on a display device in a small-sized electronic equipment, a portable electronic equipment, or the like, a method using a cursor key has been generally employed. In this method, however, the cursor must be moved to the target icon in a small screen, and its operation is difficult.

SUMMARY OF THE INVENTION

An object of present invention is to provide a pointing method in which a target selection object can be selected by a simple operation.

In a pointing method for selecting a target selection object from a plurality of selection objects which are displayed on a display device, a first pointing method according to the present invention is characterized in that the target selection object is selected by providing N (N is an integer of not less than two) keys used for pointing, dividing a screen into N areas in correspondence with the N keys and displaying the N areas such that they can be distinguished, enlarging, when the key corresponding to the area where the target selection object exists is operated by a user, only the area corresponding to the key to the size of one screen and displaying the screen obtained by the enlargement, and dividing the screen into N areas in correspondence with an arrangement of the N keys and displaying the N areas such that they can be distinguished, and performing the same processing every time a key operation is performed by the user.

In a pointing method for selecting a target selection object from a plurality of selection objects which are displayed on a display device, a second pointing method according to the present invention is characterized in that the target selection object is selected by providing four keys used for pointing, dividing a screen into four areas in correspondence with the four keys and displaying the four areas such that they can be distinguished, enlarging, when the key corresponding to the area where the target selection object exists is operated by a user, only the area corresponding to the key to the size of one screen and displaying the screen obtained by the enlargement, and dividing the screen into four areas in correspondence with an arrangement of the four keys and displaying the four areas such that they can be distinguished, and performing the same processing every time a key operation is performed by the user.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
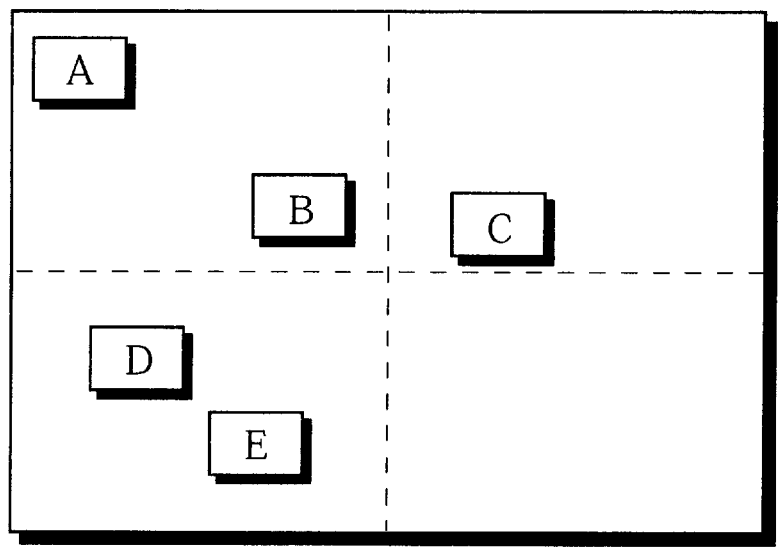
FIG. 1 is a schematic view showing a screen displayed on a display device in a portable electronic equipment and four keys provided for selecting a selection object such as an icon.
Figure 1:
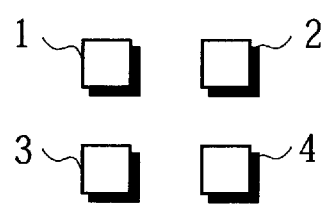

Referring now to the drawings, embodiments of the present invention will be described.

[1] Description of First Embodiment

FIG. 1 illustrates a screen displayed on a display device in a portable electronic equipment and four keys 1, 2, 3, and 4 provided for selecting a selection object such as an icon.

On the screen shown in FIG. 1, five icons A, B. C, D, and E are displayed. Further, the screen is divided into four areas by boundary display indicated by a broken line in correspondence with an arrangement of the four keys 1, 2, 3, and 4.

Description is now made of an operation by a user and an operation of the electronic equipment for selecting the icon A when the icon A is a target icon.

Figure 2:
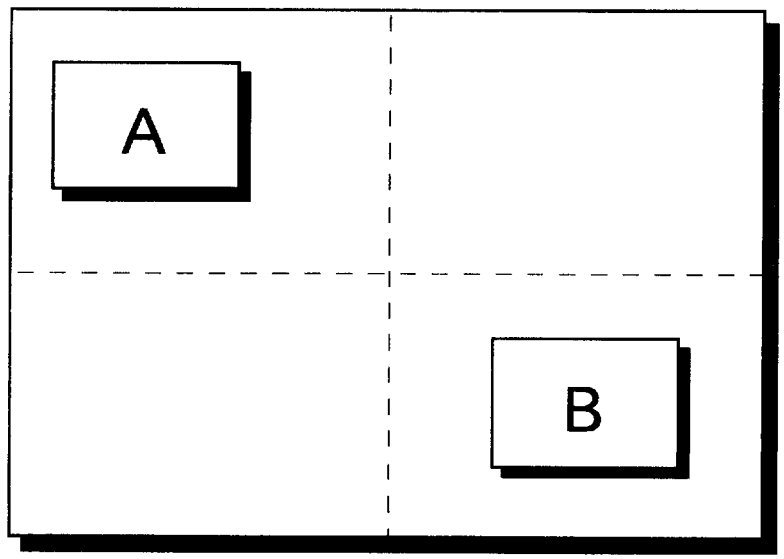
FIG. 2 is a schematic view showing a screen displayed when a key 1 is operated from a state shown in FIG. 1.

The target icon A exists in the upper left area of the divided screen. Accordingly, the user operates the key 1 corresponding to the area where the icon A exists. Consequently, only an image corresponding to the upper left area is enlarged to the size of one screen, and the screen obtained by the enlargement is displayed. The screen is divided into four areas in correspondence with an arrangement of the four keys 1, 2, 3, and 4, and the four areas are displayed such that they can be distinguished, as shown in FIG. 2. On the screen, the two icons A and B are displayed.

The target icon A exists in the upper left area of the divided screen, and no other icon exists in the area. When the user operates the key 1 corresponding to the area where the icon A exists, therefore, the icon A is selected.

[2] Description of Second Embodiment

Figure 3:
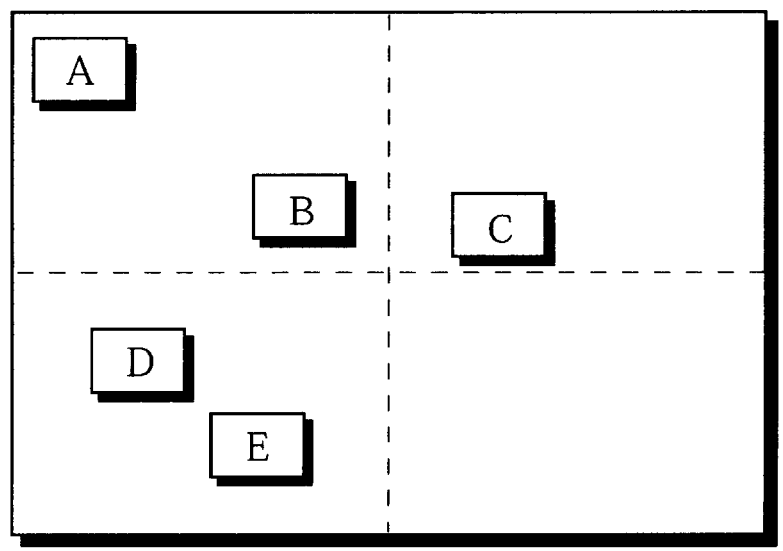
FIG. 3 is a schematic view showing a screen displayed on a display device in a portable electronic equipment, four keys provided for selecting a selection object such as an icon, and a determination key.
Figure 3:
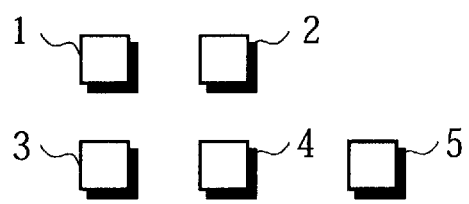

FIG. 3 illustrates a screen displayed on a display device in a portable electronic equipment, four keys 1, 2, 3, and 4 provided for selecting selection objects such as icons, and a determination key 5.

On the screen shown in FIG. 3, five icons A, B, C, D, and E are displayed. Further, the screen is divided into four areas by boundary display indicated by a broken line in correspondence with an arrangement of the four keys 1, 2, 3, and 4.

Description is now made of an operation by a user and an operation of the electronic equipment for selecting the icon A when the icon A is a target icon.

Figure 4:
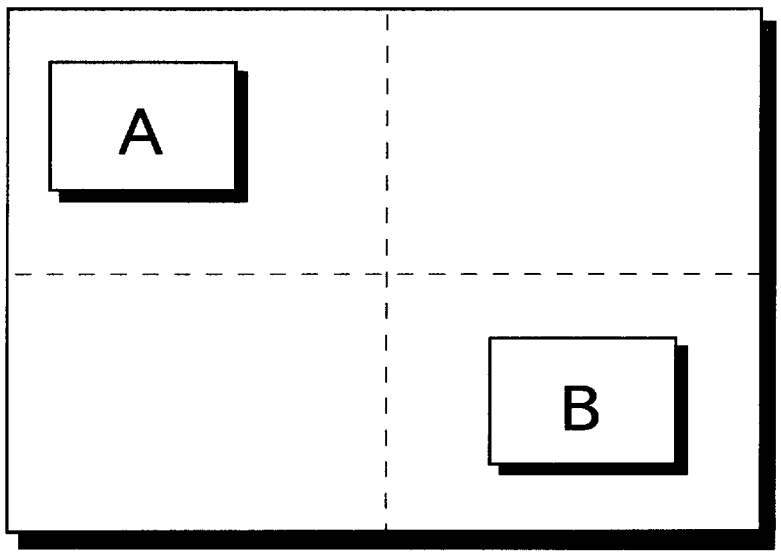
FIG. 4 is a schematic view showing a screen displayed when a key 1 is operated form a state shown in FIG. 3.

The target icon A exists in the upper left area of the divided screen. Accordingly, the user operates the key 1 corresponding to the area where the icon A exists. Consequently, only an image c corresponding to the upper left area is enlarged to the size of one screen, and the screen obtained by the enlargement is displayed. The screen is divided into four areas in correspondence with an arrangement of the four keys 1, 2, 3, and 4, and the four areas are displayed such that they can be distinguished, as shown in FIG. 4. On the screen, the two icons A and B are displayed.

Figure 5:
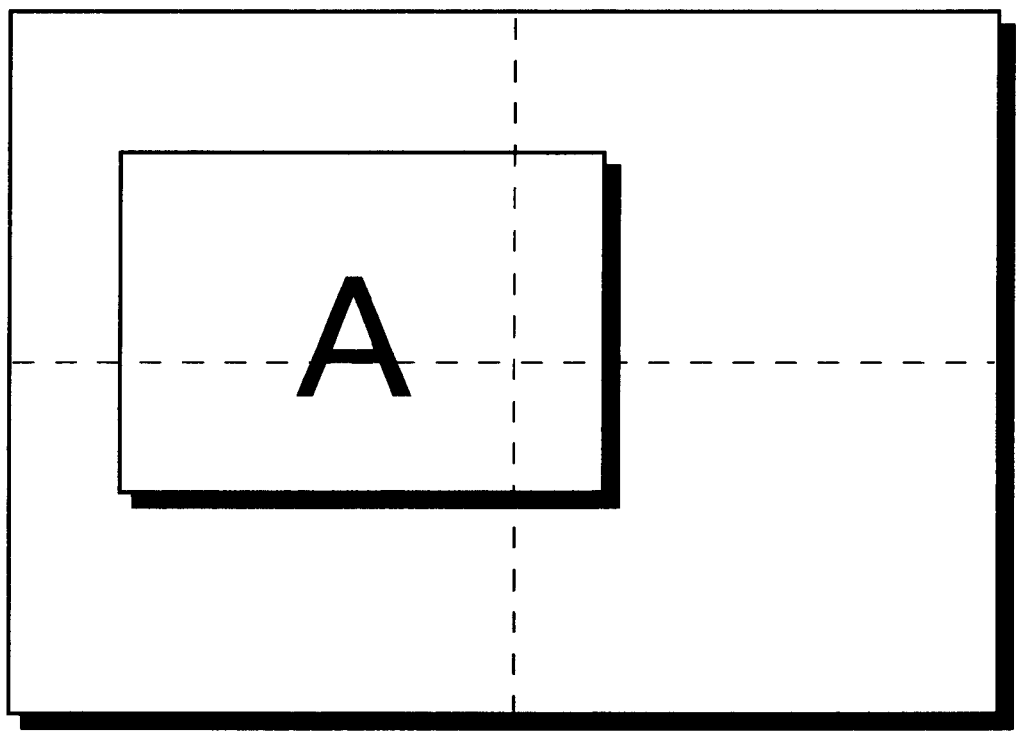
FIG. 5 is a schematic view showing a screen displayed when a key 1 is operated from a state shown in FIG. 4.

The target icon A exists in the upper left area of the divided screen. Accordingly, the user operates the key 1 corresponding to the area where the icon A exists. Consequently, only an image corresponding to the upper left area is enlarged to the size of one screen, and the screen obtained by the enlargement is displayed. The screen is divided into four areas in correspondence with an arrangement of the four keys 1, 2, 3, and 4, and the four areas are displayed such that they can be distinguished, as shown in FIG. 5. On the screen, only the one icon A is displayed. When the determination key 5 is operated in a state where only the one icon A is thus displayed, the icon A is selected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pointing method for selecting a target selection object from a plurality of selection objects which are displayed on a display device, wherein the target selection object is selected by providing N (N is an integer of not less than two) keys used for pointing, and a determination key, said method comprising the steps of:

dividing a screen into N areas in correspondence with the N keys and displaying the N areas such that they can be distinguished, enlarging, when the key corresponding to the area where the target selection object exists is operated by a user, only the area corresponding to the operated key to the size of one screen, and displaying the screen obtained by the enlargement, dividing the screen into N areas in correspondence with an arrangement of the N keys and displaying the N areas such that they can be distinguished, and performing the same processing every time a key operation is performed by the user until the determination key is operated by the user while only the target selection object is displayed on the screen.

2. A pointing method for selecting a target selection object from a plurality of selection objects which are displayed on a display device, wherein the target selection objection is selected by providing four keys used for pointing, and a determination key, said method comprising the steps of:

dividing a screen into four areas in correspondence with the four keys and displaying the four areas such that they can be distinguished, enlarging, when the key corresponding to the area where the target selection object exists is operated by a user, only the area corresponding to the operated key to the size of one screen, and displaying the screen obtained by the enlargement, dividing the screen into four areas in correspondence with an arrangement of the four keys and displaying the four areas such that they can be distinguished, and performing the same processing every time a key operation is performed by the user until the determination key is operated by the user while only the target selection object is displayed on the screen.

* * * * *